United States Patent [19]
Yamamoto

[11] Patent Number: 5,790,033
[45] Date of Patent: Aug. 4, 1998

[54] BEHAVIOR TRANSLATION METHOD

[76] Inventor: Masaomi Yamamoto, 18-34 Moegino, Midori-ku, Yokohama-shi, Kanagawa-ken, Japan

[21] Appl. No.: 690,526

[22] Filed: Jul. 31, 1996

[30] Foreign Application Priority Data

Jun. 14, 1996 [JP] Japan ................. 8-175852

[51] Int. Cl.$^6$ .................................... G08B 23/00
[52] U.S. Cl. .................................... 340/573; 395/2.67
[58] Field of Search .................. 340/573, 691, 340/825.19; 395/2.09, 2.67, 2.86; 364/419.02, 419.03, 419.07; 381/42, 51, 56, 110; 119/718, 905; 434/308; 382/110

[56] References Cited

U.S. PATENT DOCUMENTS

| | | | |
|---|---|---|---|
| 4,769,846 | 9/1988 | Simmons | 395/2.67 X |
| 4,876,728 | 10/1989 | Roth | 382/153 |
| 4,907,169 | 3/1990 | Lovioi | 395/94 |
| 5,471,541 | 11/1995 | Burtnyk et al. | 382/153 |
| 5,483,441 | 1/1996 | Scofield | 364/400 |
| 5,500,904 | 3/1996 | Markandey et al. | 382/103 |
| 5,506,682 | 4/1996 | Pryor | 356/375 |

*Primary Examiner*—Thomas Mullen
*Attorney, Agent, or Firm*—Jordan and Hamburg

[57] ABSTRACT

This invention is an animal's intention translational method. This method is, first of all, to receive either of the two or both of informational signals about a voice of the animal such as a baby, pet, and domestic animal that they utter and animals actions. After that, it compares with the received informational signal and the data which are analysed by the animal behavioralism before hand, and it selects the data. In addition, the received informational signal is indicated what the animal appeals in words or letters that people are able to understand. As for the above mentioned invention, people are able to communication correctly with the animal.

2 Claims, 7 Drawing Sheets

BEHAVIOR TRANSLATION METHOD

BACKGROUND OF THE INVENTION

This invention relates to a translation method for permitting people to understand correctly behavior of a baby, pet, or domestic animal as well as trained professionals.

Conventional communication between a living entity such as a baby, pet, and domestic animal and a human being is performed using intuition on the part of the human being.

In conventional communication using intuition of a human being, only people who understood sufficiently the action of the entity can provide accurate communication. On the other hand, people who cannot understand sufficiently the action of the entity cannot effect accurate communication.

SUMMARY OF THE INVENTION

It is an object of the present invention to provide a behavior translation method which receives either or both of information signals representing the voice of a living entity such as a baby, pet, and domestic animal or the action of the entity.

It is another object of the present invention to provide a translation method which compares an information signal with data analyzed by animal behavioralists beforehand, to select an output associated with the information signal.

It is another object of the present invention to provide a translation method which selects a word or a display that people are able to understand corresponding to the information signal.

It is another object of the present invention to provide a translation method permitting people to understand the actions of a living entity such as a baby, pet, or domestic animal.

The present invention provides animal's intention translation equipment comprising: a voice receiving equipment which receives a voice of the animal and changes the voice to a voice signal; an acting reflection receiving equipment which receives an action of the animal as a reflection and changes the reflection to an image signal; a comparison arithmetic equipment which compares the voice signal and the image signal with data on voice and action which are analyzed by the animal behavioralist beforehand and outputs the selected data; and indication equipment which displays an output signal corresponding to the data selected by said comparison arithmetic process in a word or a display.

The present invention provides an animal's intention translation equipment comprising: voice receiving equipment which receives a voice of the animal and converts it to a voice signal; a comparison arithmetic process which compares the voice signal with data for a voice previously analyzed by an animal behavioralist and outputs selected data; and an indication process which indicates the selected data in a word or a display.

The present invention provides animal translation equipment comprising: an acting reflection receiving process which receives an action of the animal and produces an image signal; a comparison arithmetic process which compares the image signal with data for animal actions previously analyzed by an animal behavioralist and outputs selected data; and an indication process which indicates the selected data in a word or a display.

The above and further objects and novel features of the invention will more fully appear from the following detailed description when the same is read in connection with the accompanying drawings. It is to be expressly understood, however, that the drawing is for the purpose of illustration only and is not intended as a definition of the limits of the invention.

DESCRIPTION OF THE PREFERRED EMBODIMENT

Preferred embodiments of the present invention are described in detail below referring to the accompanying drawings.

Figure 1:
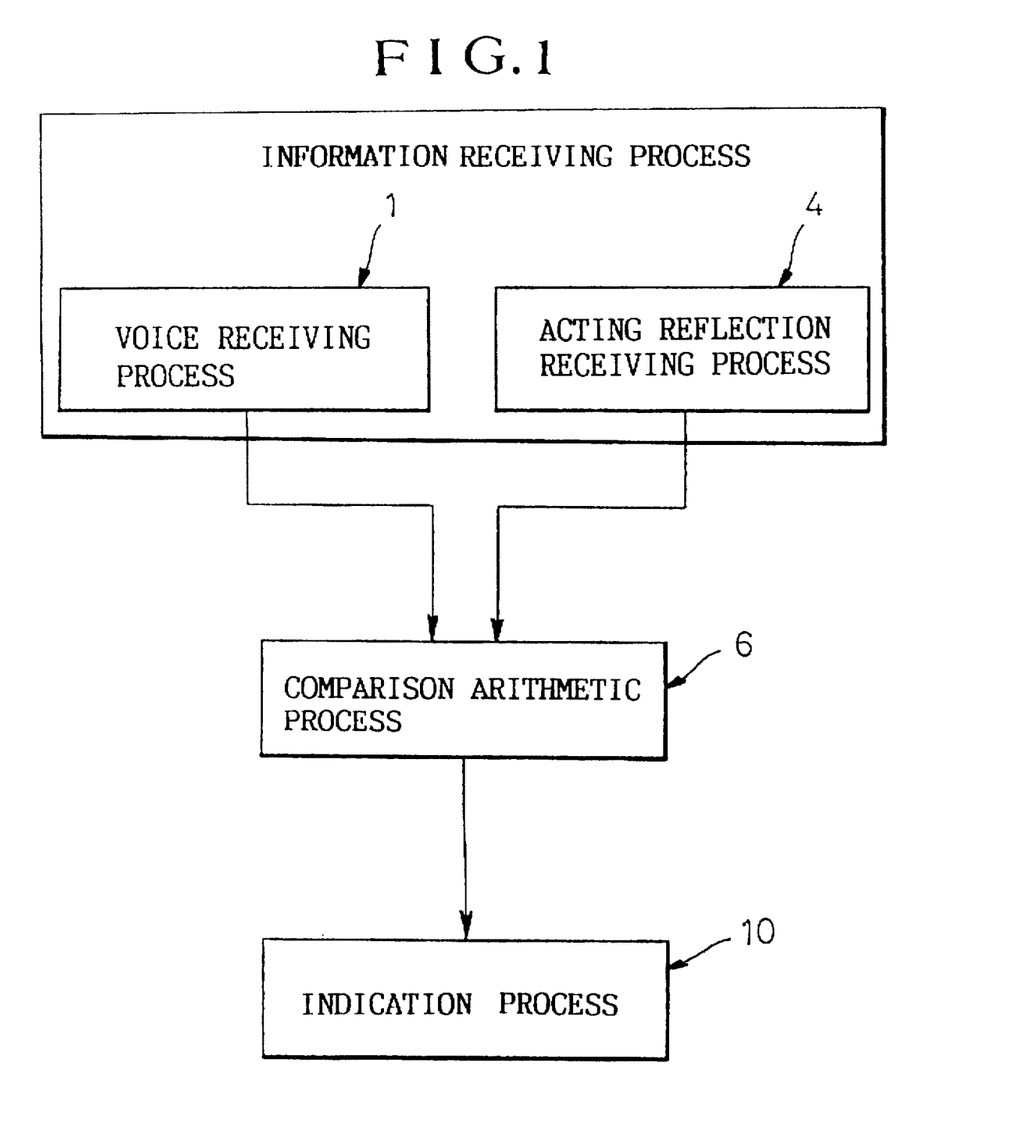
FIG. 1 is a drawing showing a first embodiment of the present invention.
Figure 2:
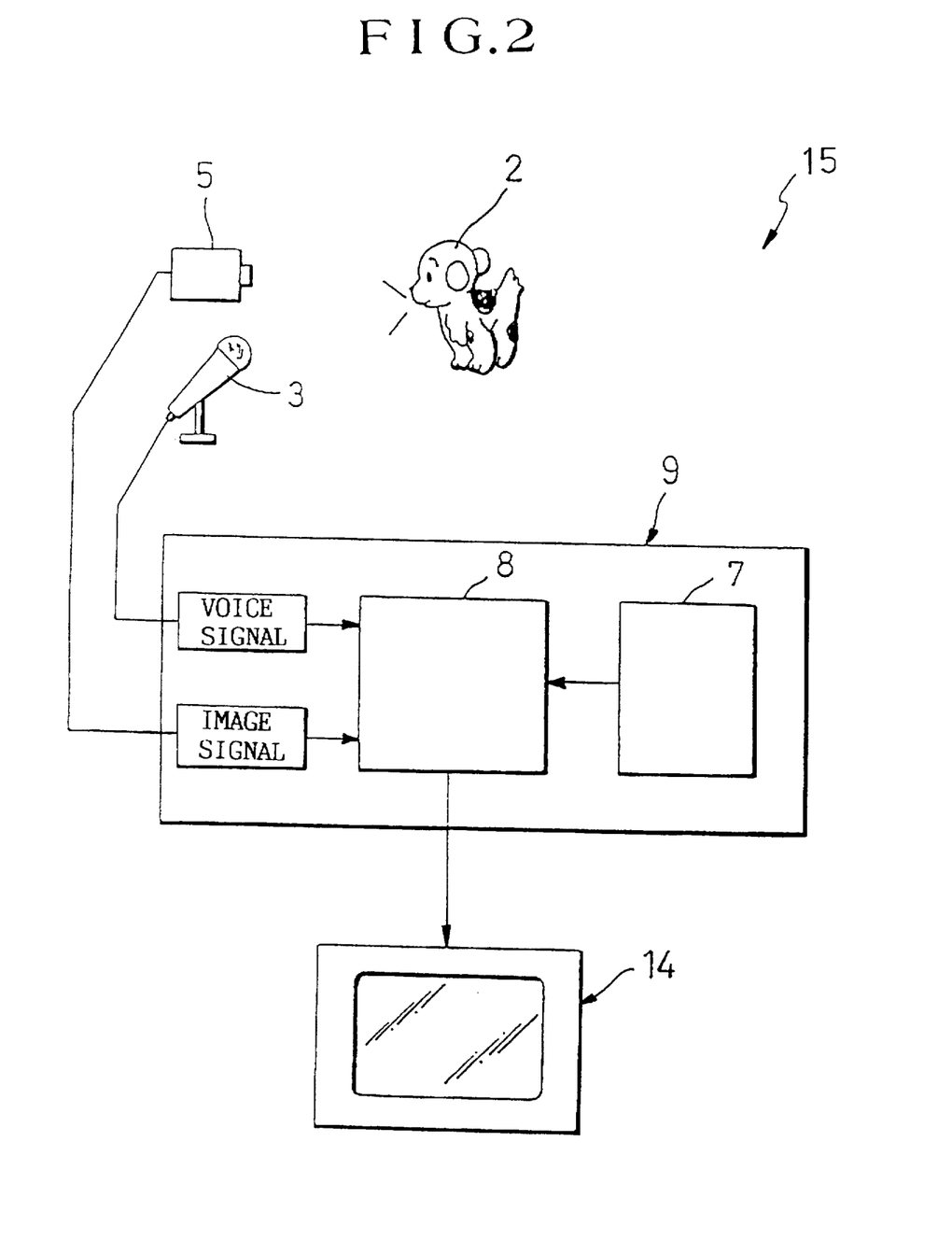
FIG. 2 is a block diagram showing the first embodiment of the present invention.
Figure 3:
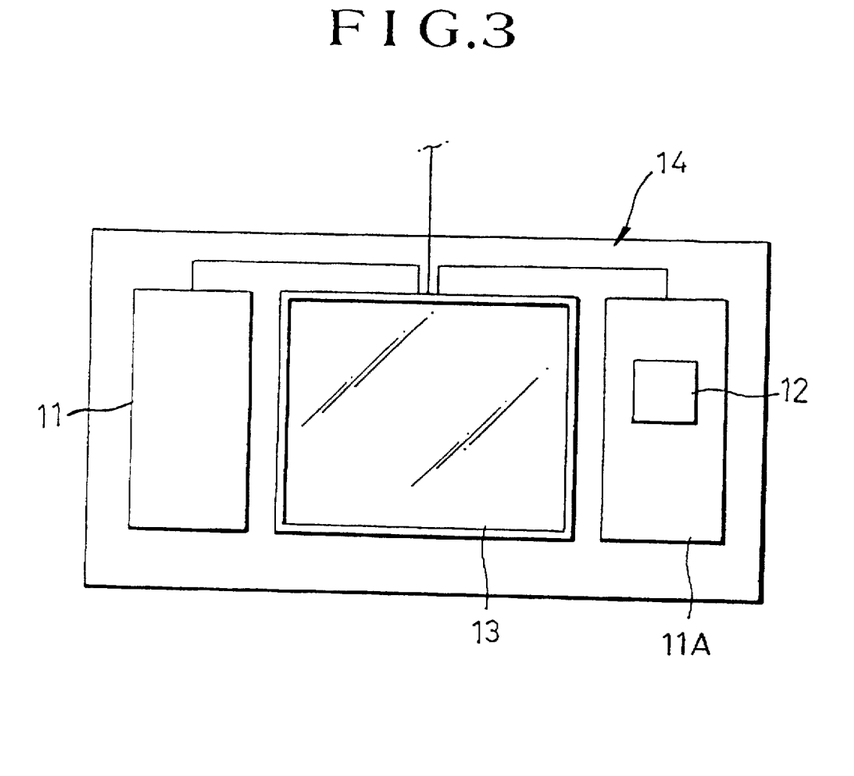
FIG. 3 is an explanation drawing about indication equipment showing the first embodiment of the present invention.

FIGS. 1 to 3 illustrate a first embodiment of the present invention. A voice receiving process 1, including an information receiving process, receives a sound uttered by a pet 2 such as a dog, and changes it from a sound to a voice signal. This sound receiving process 1 uses a microphone for gathering sounds as sound receiving equipment 3. The sound receiving equipment 3 receives the sound of the pet 2 without surrounding noise, and outputs the voice signal.

An acting reflection receiving process 4, including an information receiving process, receives the action of the pet 2 as a reflection, and produces an image signal. This acting reflection receiving process 4 uses a video camera as acting reflection receiving equipment 5. In this case, a microphone with a video camera is used as the voice receiving equipment 3. Furthermore, a video camera may be used having a nightvision system or voice and videotape recording system.

In the comparison arithmetic process 6, the first step is to compare both the image signal and the voice signal with data for voice and action 7 which are analyzed by the animal behavioralist beforehand using comparison equipment 8. Next step is to select either of these data. In this comparison arithmetic process 6, comparison arithmetic equipment 9 is used. The data for a voice and action 7 which are input into the comparison arithmetic equipment 9 is used to select what kind of expression of emotion, will or desire a pet 2 has based a voice of a pet 2 that the professionals have analyzed, for example, an interval, tone, musical scale, intonation, volume, intermittence, or repetitive frequency, and based on the image signal, for example, the kind of pet 2, condition, environment, or the action of rump and tail, ears, eyes, mouth, and legs.

An indication process 10 indicates the data which were selected by the comparison arithmetic process 6 in a voice that people are able to understand or in words or pictures using a display. In this indicational process 10, indication equipment 14 is used. The indication equipment 14 includes either of devices such as a loudspeaker 11, a loudspeaker 11A or a display 13 or a combination of devices. The loudspeaker 11A has translation equipment 12 which translates selectively to the language in several countries or the language in a specific country. The display 13 is a liquid crystal or a picture tube for displaying letters and pictures.

Moreover, this indication process 10 produces indications of voice, letter, or drawing corresponding to the state of the pet. These indications are indicated the expression of emotion, will, or desire of the pet which was selected by the comparison arithmetic process 6.

In the above-mentioned translation equipment for the pet 15, the voice and action of the pet are received by a voice receiving equipment 3 and acting reflection receiving equipment 5. Furthermore, the received voice and action are correlated with the expression of emotion, will, or desire which was analyzed by the professionals, which is on the indication equipment 14, through the comparison arithmetic equipment 9. Then, people are able to perform the most suitable action for the pet and promote the best suited communication with the pet.

Other embodiments of the present invention will now be described referring to FIGS. 4 to 7. Through the drawings of the embodiments, like components are denoted by like numerals as of the first embodiment and will not be further explained.

Figure 4:
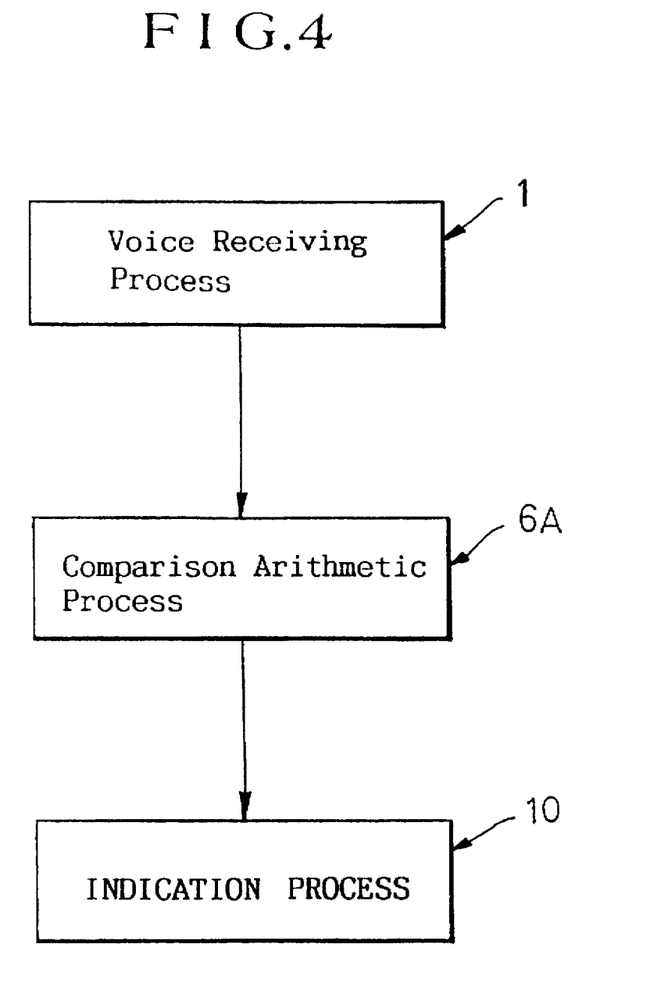
FIG. 4 is a drawing showing of a second embodiment of the present invention.
Figure 5:
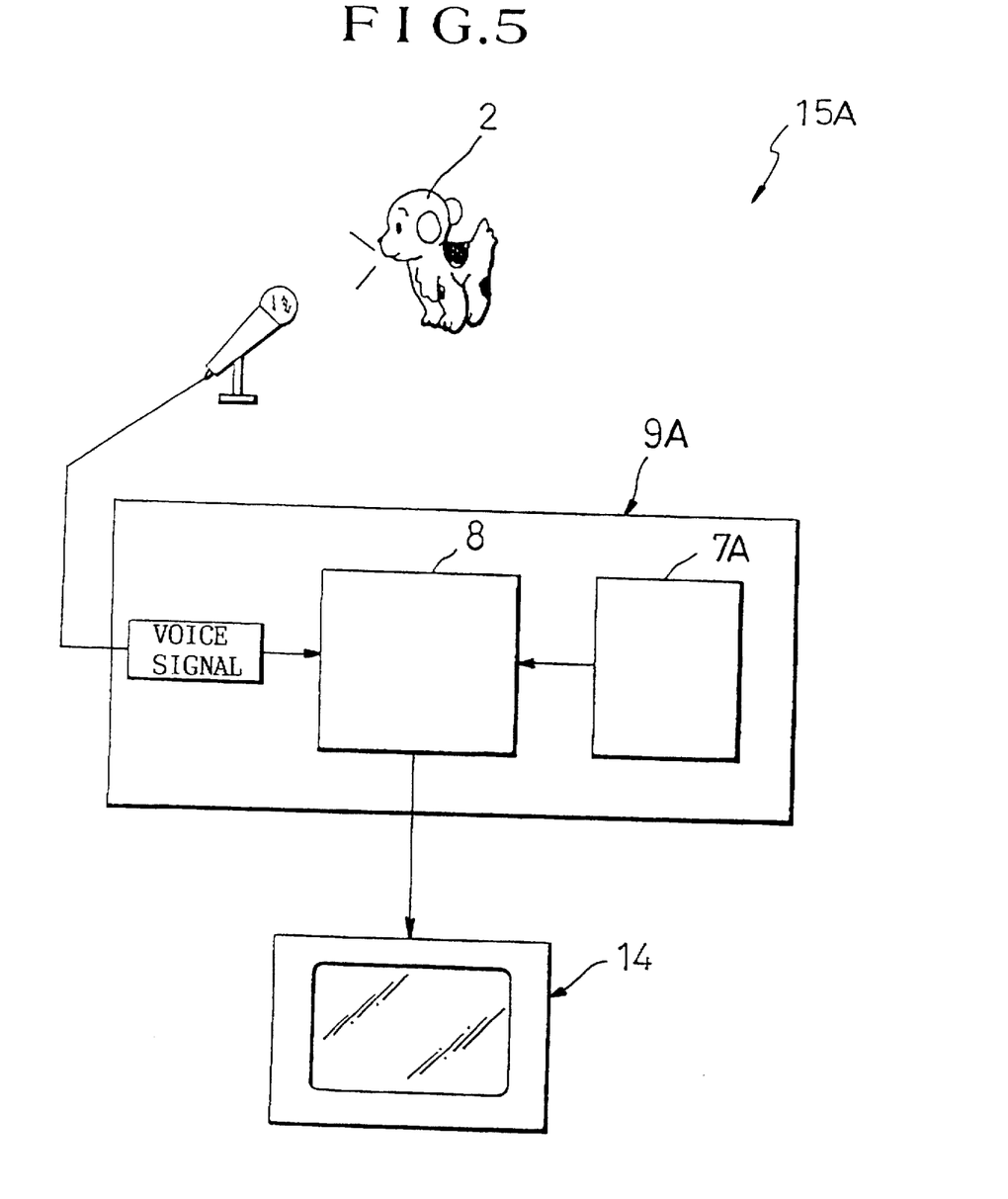
FIG. 5 is a block diagram showing the second embodiment of the present invention.

FIGS. 4 to 5 illustrate a second embodiment of the present invention which is distinguished from the first embodiment by the fact that a comparison arithmetic process 6A performs using comparison arithmetic equipment 9A. This comparison arithmetic equipment 9A selects either of the two of the compared data, that is, one is the voice signal from the voice receiving equipment 3 of the voice receiving process 1, another is voice data 7A which is analyzed by the animal behavioralist beforehand. The behavior translation equipment 15A performs only a voice receiving process 1 provides the same results permitting people to understand what kind of expression of emotion, will or desire the voice of the pet expresses.

Figure 6:
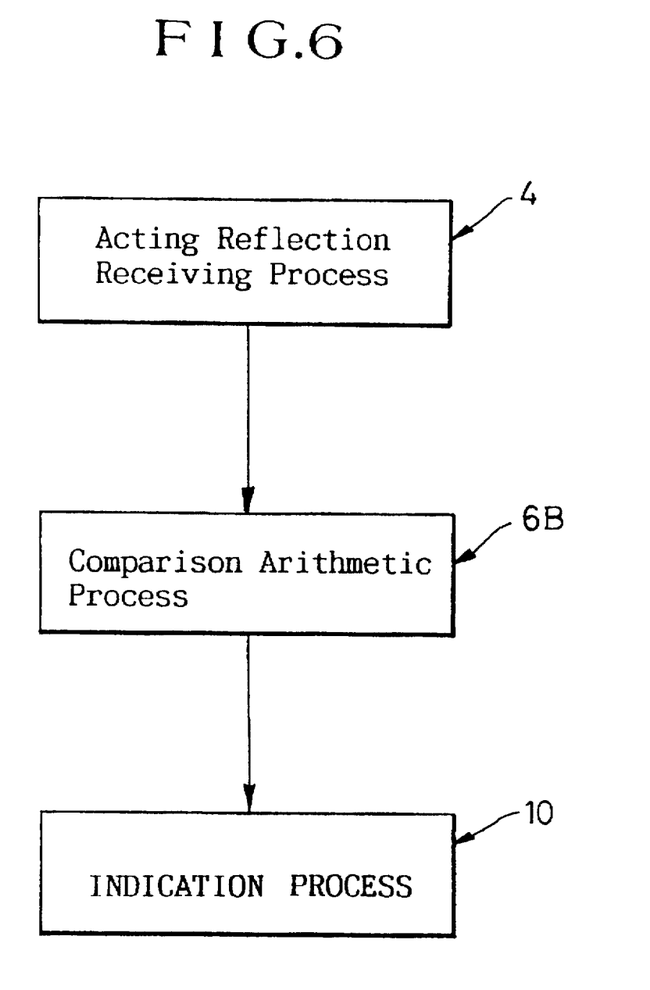
FIG. 6 is a drawing showing a third embodiment of the present invention.
Figure 7:
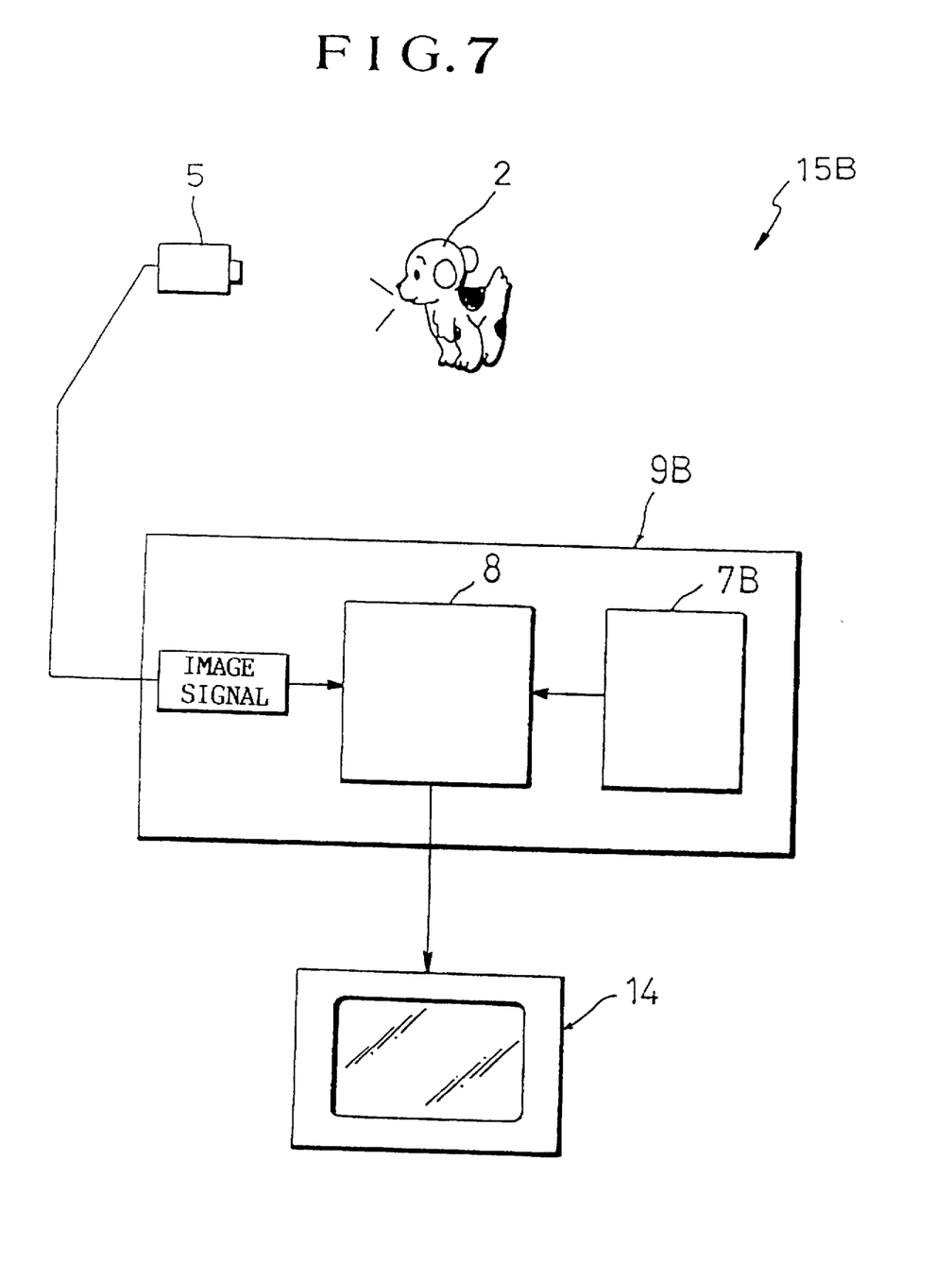
FIG. 7 is a block diagram showing the third embodiment of the present invention.

FIGS. 6 to 7 illustrate a third embodiment of the present invention which is distinguished from the first embodiment by the fact that a comparison arithmetic process 6B performs using comparison arithmetic equipment 9B. This comparison arithmetic equipment 9B compares an image signal from the acting reflecting receiving equipment 5 of the acting reflecting receiving process 4 with the data on actions 7B which were analyzed by the animal behavioralist beforehand. The intention translational equipment 15B performing only the acting reflection receiving process 4 provides the same results permitting people to understand what kind of expression of emotion will or desire the pet expresses.

Furthermore, each embodiment of the present invention permits people to understand what the pet is expressing, however, these embodiments are not intended to be the limits of this invention. The data for voice and action of a living entity such as a baby, all sorts of pets and domestic animal can be used as the data of the comparison arithmetic equipment 9, 9A, or 9B. Then, it provides the same effects that people are able to understand what kind of the expression of emotion, will, or desire the voice the entity expresses.

As set forth above, the advantages of the present invention are as follows:

(1) The present invention consists of an information receiving process, a comparison arithmetic process, and an indication process. The information receiving process receives either of the two or both of signals of the voice of a living entity such as a baby, pet, and domestic animal or their actions, and produces a voice or action information signal. The comparison arithmetic process compares the information signal from the information receiving process with the data analyzed by the animal behavioralist beforehand, and it selects corresponding data. Moreover, an indication process indicates the data which were selected in the comparison arithmetic process in a voice, letters, or pictures using a display. Because the present invention consists of these elements, people are able to understand the expression the entity is communicating as well as professionals who judge the expression of the animal from animal's voice and action, even if people cannot directly understand the expression of the animal.

Therefore, people are able to effect accurate communication with animals because they are able to know correctly the expression of the animal. In addition, mistreatment of the animal and resulting neurosis can be prevented.

(2) As discussed above, people are able to be playful with the animal and to promote the communication with the animal because they are able to understand the expression of the animal as well as the professionals.

(3) As discussed above, people are soon able to know the expression of the animal and they can performed the fittest corresponding action quickly because they are able to know the expression of the animal from a voice or a display by or both of a voice and action of the animal.

What is claimed is:

1. A translation apparatus for translating voice and actions of a living entity, including one of an animal and a human, into user recognizable indicators, comprising:

a sound transducer for receiving a voice of the living entity and converting said voice into a voice signal;

a video camera for monitoring actions of said living entity and converting said actions into a video signal;

an information processor for processing said voice signal and said video signal into voice data and image data, respectively, representative of the voice and action images of the living entity;

a database including previously stored voice and action data correlated with communicative meanings associated with said previously stored voice and action images data;

a comparison arithmetic processor for comparing said voice and action images data with said previously stored voice and action images data and selecting at least one of said previously stored voice and action images data based on said comparison; and an indication means for indicating to said user one of said communicative meanings correlated with said selected one of said previously stored voice and action images data.

2. A translation method for translating voice and actions of a living entity, including animals and humans, into user recognizable indicators, comprising:

receiving a voice of the living entity and converting said voice into a voice signal;

monitoring actions of said living entity and converting said actions into a video signal;

processing said voice signal and said video signal into voice data and image data, respectively, representative of the voice and action images of the living entity;

providing a database including previously stored voice and action data correlated with communicative meanings associated with said previously stored voice and action images data;

comparing said voice and action images data with said previously stored voice and action images data and selecting at least one of said previously stored voice and action images data based on said comparison; and indicating to said user one of said communicative meanings correlated with said selected one of said previously stored voice and action images data.

* * * * *